United States Patent [19]

Koshimo

[11] Patent Number: 4,903,803
[45] Date of Patent: Feb. 27, 1990

[54] LOCK-UP DAMPER DISK OF A TORQUE CONVERTER

[75] Inventor: Masahiko Koshimo, Higashiosaka, Japan

[73] Assignee: Kabushiki Kaisha Daikin Seisakusho, Osaka, Japan

[21] Appl. No.: 210,043
[22] PCT Filed: Oct. 16, 1987
[86] PCT No.: PCT/JP87/00798
  § 371 Date: Jun. 2, 1988
  § 102(e) Date: Jun. 2, 1988
[87] PCT Pub. No.: WO88/03621
  PCT Pub. Date: May 19, 1988

[30] Foreign Application Priority Data
  Nov. 6, 1986 [JP] Japan .................. 61-170593[U]

[51] Int. Cl.⁴ ............................................. F16H 45/02
[52] U.S. Cl. ............................. 192/3.28; 192/106.2
[58] Field of Search ........... 192/3.28, 3.29, 3.3, 192/3.31, 106.2; 464/66, 67

[56] References Cited
U.S. PATENT DOCUMENTS 3,702,721 10/1987 Lamarche .................. 192/106.2 X
4,240,532 12/1980 Blomquist .................. 192/3.28
4,437,551 3/1984 Gimmler et al. ............ 192/3.28
4,646,886 3/1987 Nishimura .................. 192/3.28
4,727,767 3/1988 Aiki et al. .................. 74/574
4,747,801 5/1988 Chasseguet et al. ......... 192/106.2 X

FOREIGN PATENT DOCUMENTS 0028126 12/1983 Japan .
0049161 3/1985 Japan ..................... 192/3.3

Primary Examiner—Rodney H. Bonck
Attorney, Agent, or Firm—Armstrong, Nikaido, Marmelstein, Kubovcik & Murray

[57] ABSTRACT

A damper disk for a lock-up clutch disposed in a torque converter includes a clutch plate as an input member, damper springs for elastically connecting the clutch plate to a turbine of a torque converter and a drive plate. The drive plate is made of sheet metal and is fixed to the clutch plate. The drive plate includes rims and support walls for holding the damper springs, as well as, radially outer projections and inner projected walls engaging the springs. Claws rigidly connected to the turbine are disposed between the projections and projected walls. The rims includes stoppers at the ends thereof which are radially inwardly inclined for preventing axial movement of the damper springs.

2 Claims, 10 Drawing Sheets

LOCK-UP DAMPER DISK OF A TORQUE CONVERTER

FIELD OF THE INVENTION

The present invention relates to a lock-up damper disk for use as a lock-up clutch disk of a torque converter and is operable to damp torque vibration transmitted from an engine.

BACKGROUND OF THE INVENTION

Figures 14, 14A:
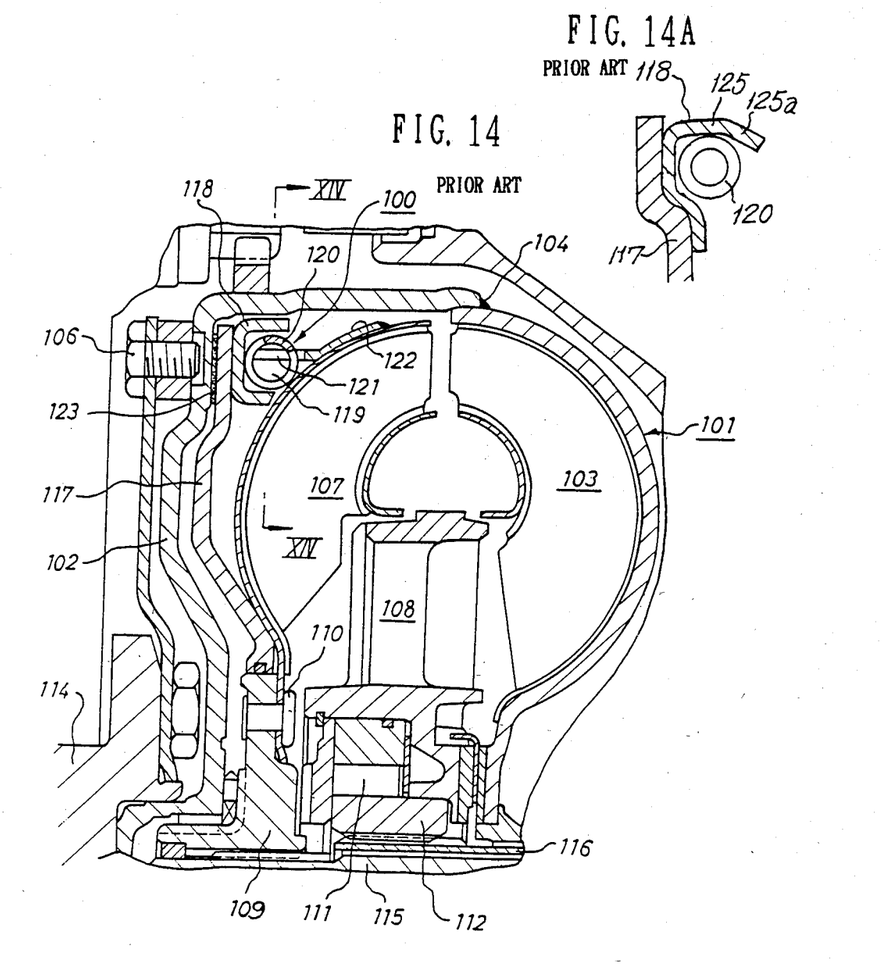
FIGS. 14 and 14A are fragmentary sectional views illustrating a prior art.
Figure 15:
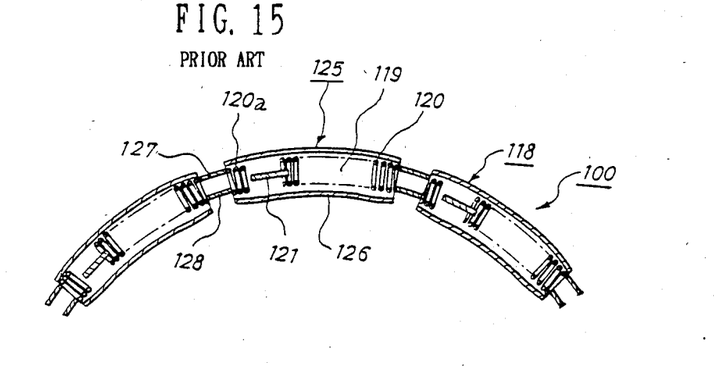
FIG. 15 is a fragmentary sectional view taken along the line XV—XV in FIG. 14.
Figure 16:
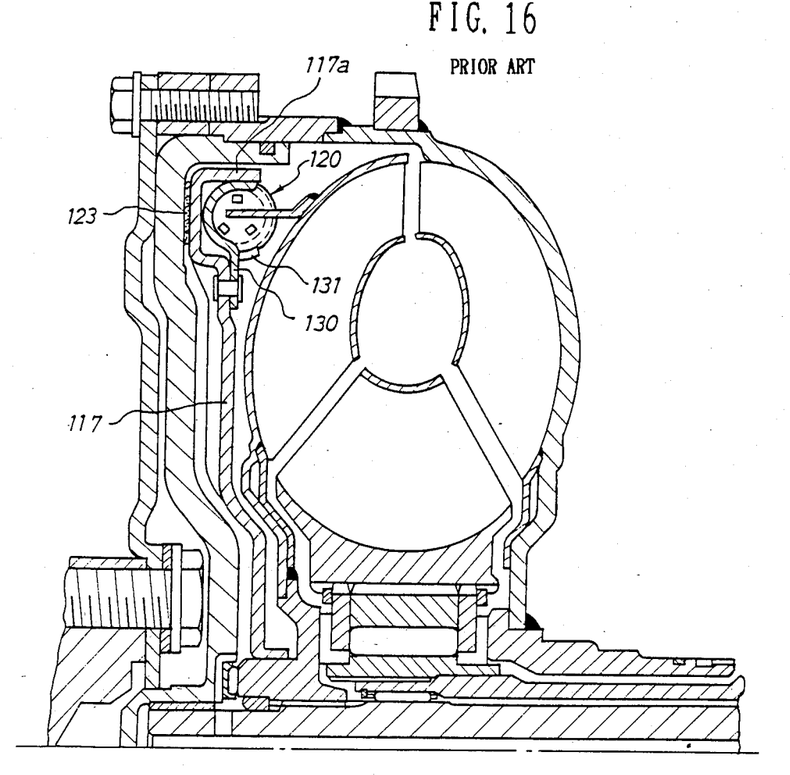
FIGS. 16 is a fragmentary sectional view illustrating another prior art.
Figure 17:
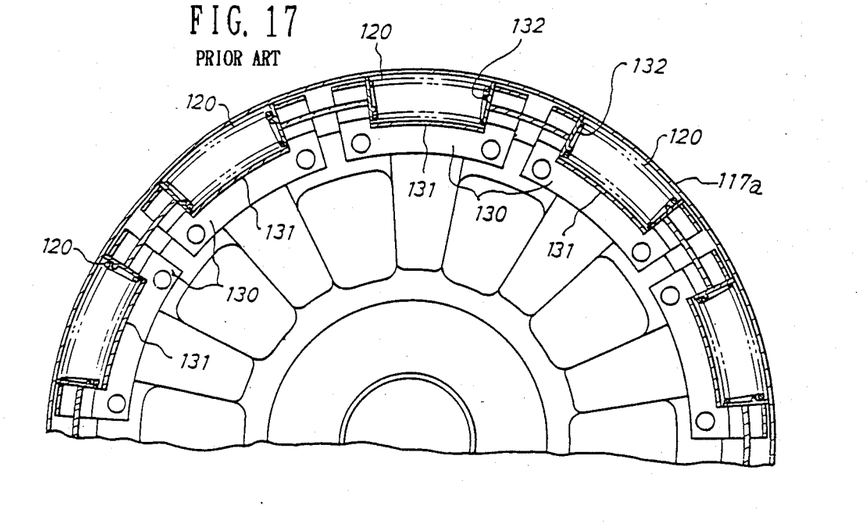
FIG. 17 is a fragmentary sectional view of the structure in FIG. 16.

FIGS. 14 and 15 illustrate the lock-up clutch damper disc disclosed in the U.S. Pat. No. 4,240,532, and FIG. 16 and 17 illustrate an embodiment disclosed in the Japanese patent publication No. 61-28126.

In FIG. 14, a damper disk 100, used as a lock-up clutch disc is disposed between a main part 101 of a torque converter and a front cover 102 welded at a portion 104 to a pump 103 and is connected at an outer peripheral coupling 106 to an input shaft 114. A turbine 107 is connected by rivets 110 to a hub 109 splined onto an output shaft 115. A stator 108 has a one-way clutch 111, of which inner race 112 is splined to a stationary cylindrical shaft 116. The damper disk 110 comprises a clutch plate 117, or piston, axially slidably supported on the hub 109, a drive ring 118 welded to a rear surface of the clutch plate 117, circumferentially extending damper springs 120 disposed in pockets 119 in the drive plate 118, and a driven plate 122 which have claws 121 engaging with the damper springs 120 and fixed to the turbine 107. A friction facing 123 is fixed to a front surface of the clutch plate 117.

When the facing 123 on the clutch plate 117 is pressed onto the front cover 102 by a difference between pressures at the opposite sides of the clutch plate 117, the front cover 102 is connected to the turbine 107 through the damper disk 100.

As shown in FIG. 15, the drive plate 118 has outer rims 125 and inner support walls 126, for forming the spring pockets 119 therebetween, as well as projections 127 and 128 which form spring receivers or spring supports at opposite sides of the spring pockets 119. Each spring pocket 119 accommodates a set of one long damper spring 120 and one short damper spring 120a. The claws 121 are disposed between adjacent springs 120 and 120a.

There are following disadvantages in the structures disclosed in the U.S. Pat. No. 4,240,532.

In the assembling operation, each pair of the springs 120 and 120 must be held apart in each pocket 119 so as to insert the claw 121 therebetween. This operation is laborious and it is difficult to check the correct relationship between the springs and claws during the assembling.

In a high speed driving, a strong centrifugal force is applied from the springs to the outer rims 25. However, when the clutch is engaging or disengaging, i.e., when the clutch plate axially moves, the springs 120 and 120a directly engaging the claws 121 tend to axially move together with the claws 121 with respect to the drive plate 118. Therefore, a large friction is caused between the springs 120 and 120a and the outer rims 125, which prevents the smooth movement of the clutch plate, and thus, the smooth operation of the clutch.

Since the centrifugal force of the springs 120 and 120a is directly applied to the outer rims 125, the outer rims 125 must be made of a thick plate. As shown in FIG. 14, because the drive plate 118 has a thickness nearly the same as that of the clutch plate 117, the spring pockets are axially narrow so that it may be impossible to dispose damper springs having a large diameter therein, even when the large springs are desirable for achieving effective damping function. Further, the thick plate causes increase in the weight, which deteriorates the response of the clutch. The thick plate also causes increase in cost.

In order to avoid the above disadvantages, such structures may be employed, as shown in FIG. 14a, in which end portions of the drive plate 118 fixed to the clutch plate 117 are radially inwardly curved to form stoppers 125a for preventing axial movement of the damper springs 120. These inclined stoppers 125a increase the strength of the rims 125 so that the thickness of the plate can be reduced to some extent. However, because the the centrifugal force of the damper springs 120 is supported only by the drive plate 118, it is impossible to sufficiently reduce the thickness of the plate.

In the device shown in FIGS. 16, and 17, the clutch plate 117 is integrally provided with outer rims 117a which directly support the damper springs 120. Spring supports 130 which support the ends of the damper springs 120 is riveted to the clutch plate 117. The spring supports 130 include support walls 131. Spring seats 132 (FIG. 17) is associated to the springs.

There is however following disadvantages in the device shown in FIGS. 16 and 17.

Because it is necessary to use a thick plate for the clutch plate 117 for preventing deformation of the outer rims 117a to which the centrifugal force of the damper springs 120 are applied, the material cost thereof is high.

Since the damper springs are radially and axially supported by the cylindrical surfaces of the rims 117a and the radial surface of the clutch plate 117, respectively, it is necessary to increase the hardness of the surfaces for preventing the wear thereof. However, heat treatment for the hardening causes deformation of the clutch plate 117, so that it is necessary to polish it for maintaining a high flatness of the facing 123, resulting in a high manufacturing cost.

Since a plurality of spring supports 130 are used, the assembling is laborious and the precision in sizes may deteriorate.

Accordingly, it is an object of the invention to provide a damper disk overcoming the above-noted disadvantages.

SUMMARY OF THE INVENTION

The invention provides a damper disk for a lock-up clutch of a torque converter wherein the damper disk is disposed between a front cover connected to a pump of the torque converter and a turbine of the torque converter connected to an output shaft, and includes an axially movable clutch plate for frictional engagement with the front cover and a plurality of circumferentially extending damper springs for elastically connecting said clutch plate to said turbine; characterized in that a drive plate made of sheet metal is fixed at the radially inner portions thereof to clutch plate, drive plate includes rims and support walls for holding radially outer and inner sides of the damper springs, respectively, as well as, radially outer projections and inner projected walls located between the circumferentially adjacent damper springs for engaging the ends thereof, claws rigidly connected to turbine are disposed between radially adjacent projections and projected walls, respectively, the rims include stoppers at the ends thereof which are radially inwardly inclined for preventing axial movement of the damper springs, and spring seats are fitted into the ends of the damper springs, respectively.

DESCRIPTION OF THE PREFERRED EMBODIMENTS

Figure 12:
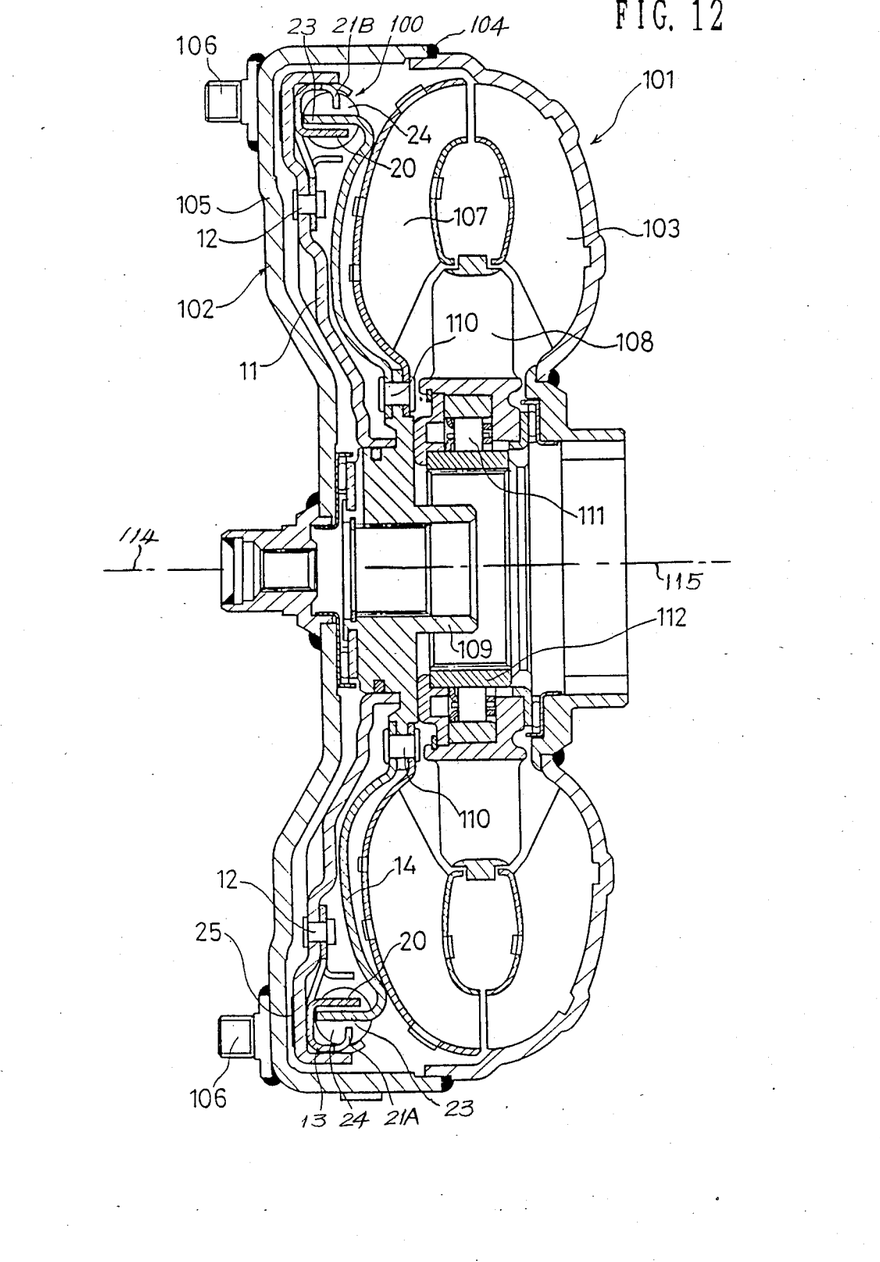
FIG. 12 is a sectional view of a torque converter incorporating the disk according to the invention.
Figure 12A:
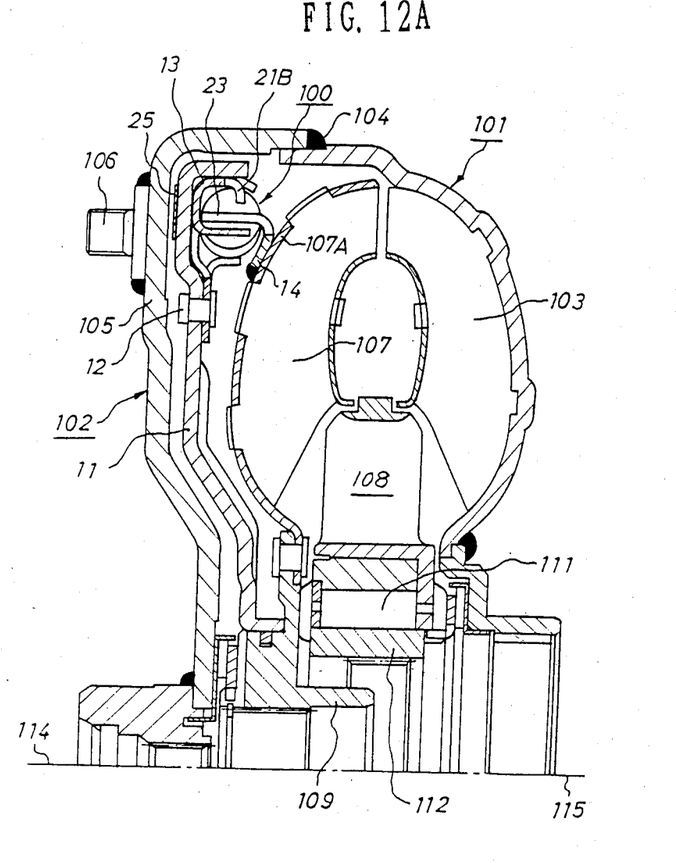
FIG. 12A is a sectional view of a torque converter incorporating the disk of another embodiment of the invention.

Referring to FIGS. 1-5, a lock-up damper disk according to the invention comprises a drive ring or drive plate 13 made of sheet metal which is fixed by rivets 12 to a piston plate or clutch plate 11, a driven ring or driven plate 14 fixed by rivets (not shown) to a hub 109 (FIG. 12) of the turbine 107, and two kinds of damper springs 15 and 16 disposed between plates 13 and 14. The driven plate 14 may be welded to the turbine shell of the turbine 107, as shown in FIG. 12A.

The drive plate 13 includes outer peripheral rims 13a which extend along inner surfaces of rims 11a at the outer peripheral of the clutch plate 11. The rims 13a have the height, in the axial direction of the disk, slightly larger than that of the rims 11a of the clutch plate 11. The drive plate 13 also includes a plurality of circumferentially spaced support walls 17 radially inside the rims 13a. Each support wall 17 is integrally formed by a portion of the drive plate 13 which is partially cut and radially bent, so that an opening 18 (FIG. 5) having a shape corresponding to the support wall 17 is formed radially outside the support wall 17. Each of the damper springs 15 and 16 which extend in the circumferential direction are disposed in spring pockets 19 formed between the outer rims 13a and the support walls 17, and are prevented from dropping or disengaging in the radially outward and inward directions. The leading end of each outer rim 13a is radially inwardly bent to form a stopper 13b (FIG. 3).

Figures 2, 3, 11, 13:
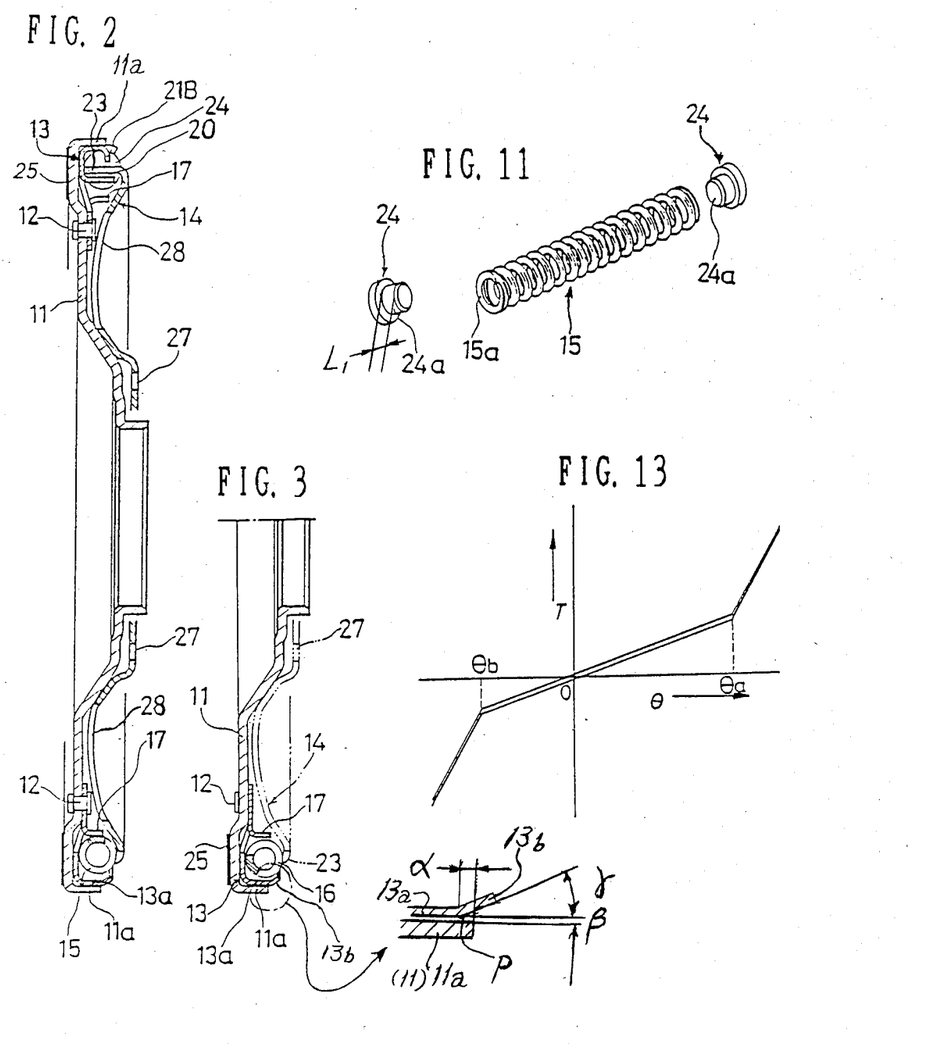
FIG. 2 is a sectional view taken along the II-II in FIG. 1.
FIG. 3 is a sectional view taken along the line III—III in FIG. 1.
FIG. 11 is an exploded perspective view illustrating a damper spring and spring seats.
FIG. 13 is a graph illustrating damping characteristics.

As clearly shown in an enlarged view, FIG. 3b associated to FIG. 3, each stopper 13b is fitted into the outer rim 11a of the clutch plate 11 with a slight space therebetween. Each stopper 13b is inclined radially inwardly at an angle of $\gamma$, and has a base end portion having an axial length of $\alpha$ which is overlapped with the leading end portion of the outer rim 11a. Since the partially tapered stopper 13b continues to the partially cylindrical outer rim 13a, the rims 13a have a high strength. The stoppers 13b extend nearly and partially around the damper springs 16 and 15. Thus, the stoppers 13b receive the centrifugal force from the damper springs 16 and 15 when they are deflected radially outwardly by the centrifugal force, and deflect to contact the inner surface of the clutch plate rims 11a.

Each rim 11a in FIG. 3 protrudes a distance of $\alpha$ beyond a boundary P between the outer rim 13a and the stopper 13b of the driven plate 13. This distance $\alpha$ between the leading end of the rim 11a and the boundary P is preferably not less than 0.

The distance $\beta$ of said space is in a predetermined range (e.g., 0.5mm), in which the elastic deformation of the rim 13a and the stoppers 13b is allowed without generating cracks thereat. In other words, the drive rim 13 may be destroyed by cracks generated between the rims 13a and spring receivers 21A or 21B which are formed by cut and bent portions of the plate, as will be detailed, when the rims 13a elastically deform to a large extent. However, in the illustrated structures, since the deformation of the rims 13a is restricted by the rims 11a, the cracking and of the rims 13a is prevented.

The drive plate 13 also includes circumferentially spaced projected walls 20, which are located between the spring pockets 19, respectively, and a plurality of pairs of the projections 21A and 21B, which are also located radially outside the walls 20 and between the spring pockets 19. The projected walls 20 are formed by portions of the plate 13 which are partially cut and radially outwardly bent through about 90 degrees, so that corresponding openings 22 are formed radially inside the projected walls 20, respectively. Each pair of the projections 21A and 21B are formed by a common portion of the plate 13 between the outer rims 13a, which is partially cut and radially outwardly bent. A recess is formed between the projections 21A and 21B at each pair.

The driven plate 14 is integrally provided at the outer periphery with circumferentially equally spaced claws or projections 23 projecting toward the drive plate 13. Each claw 23 is located between the projected wall 20 and the projections 21A and 21B of the drive plate 13.

The springs 15 and 16 consists of coil springs. The longer springs 15 are circumferentially adjacent two by two, and each shorter spring 16 is disposed between the spring pairs, each of which includes the two springs 15. Spring seats 24 are fitted into opposite ends of each of the springs 15 and 16. Each spring seat 24 has a leg 24a having a length of L1 and fitted into each end of the spring. Each end surface 15a (FIG. 11) of the spring is polished so that it may closely contact the spring seat 24.

The members and parts described above are assembled as follows.

Figure 1:
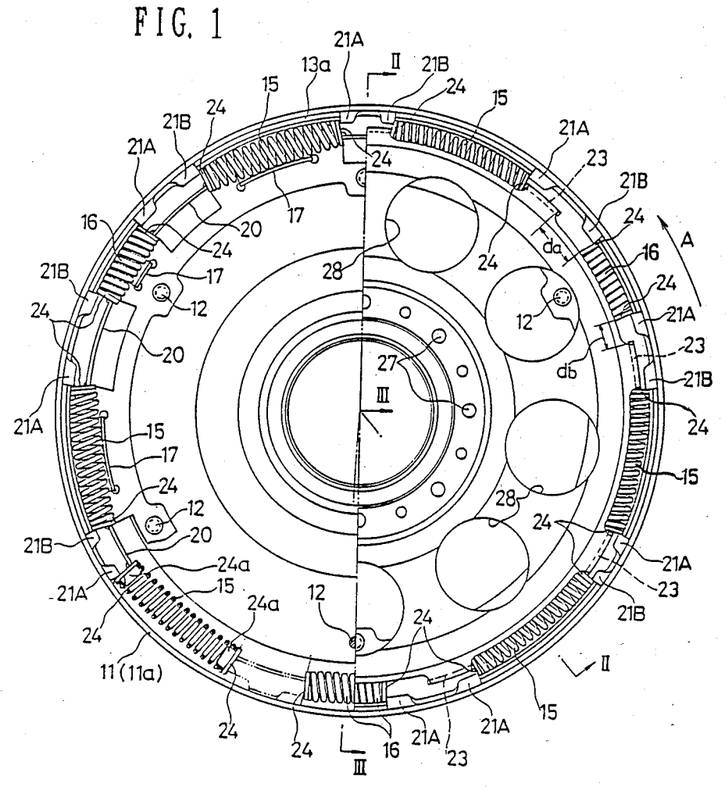
FIG. 1 is an elevation of a damper disk of an embodiment of the invention view with a half of a driven plate removed.

When the springs 15 and 16 equipped with the spring seats 24 are fitted in the spring pockets 19 in the drive plate 13, the springs 15 and 16 are slightly compressed, as shown in FIG. 1, and the spring seats 24 contact the projected walls 20 and the projections 21A or 21B, respectively. The driven plate 14 is then assembled to the drive plate 13. In this assembled condition, the spring seats 24 for the long springs 15 contact the claws 23 of the driven plate 14 without a space. However, each spring seat 24 at one end of each short spring 16 is located apart from the claw 23 with a circumferential space da, FIG. 1, therebetween, and each spring seat 24 at the other end of the spring 16 is located apart from the claw 23 with a space db therebetween. The spaces da in the positive rotation direction indicated at an arrow A in FIG. 1 is longer than the spaces db in the reverse direction.

Figures 4, 5:
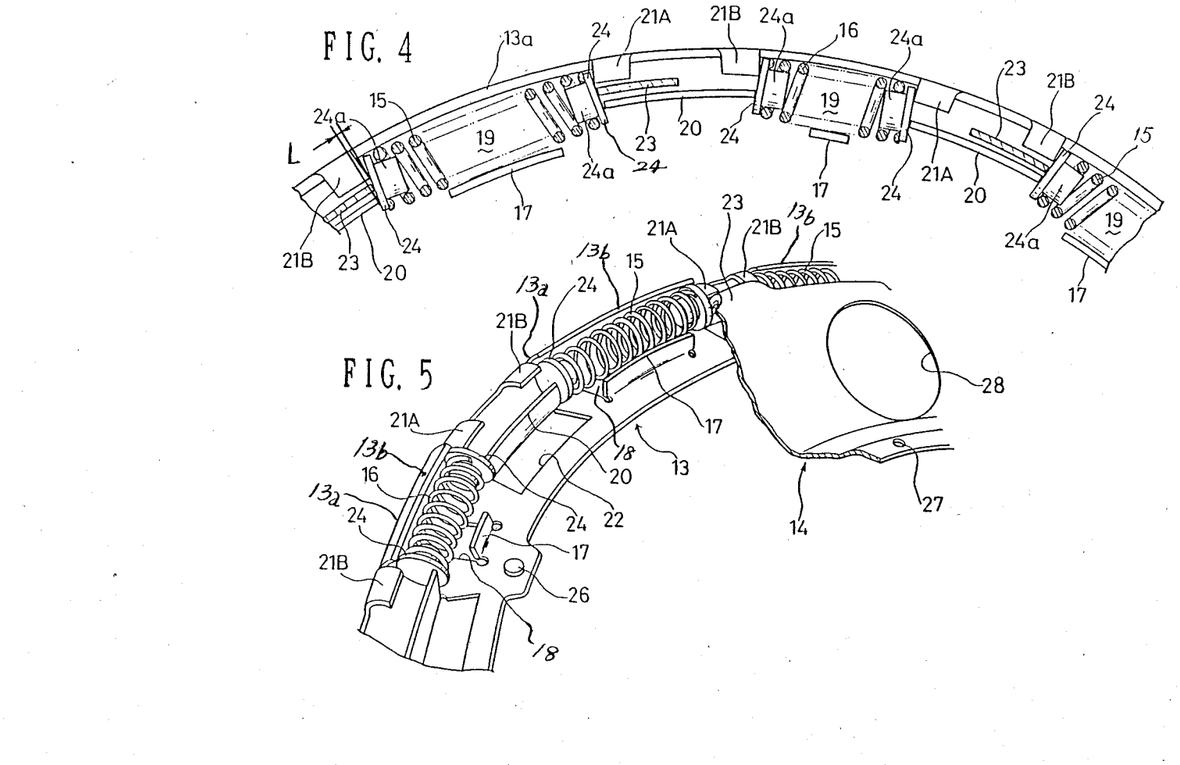
FIG. 4 is a fragmentary schematic view illustrating a part of a damper disk.
FIG. 5 is a fragmentary perspective view of the same.

As shown in FIG. 4, the projected wall 20 are circumferentially retracted or short with respect to the projections 21A and 21B so that the damper springs may form nearly linear shapes rather than a shape curved in the circumferential direction of the disk, when the disk stops or rotates at a low speed. Whereby, at the high speed driving, the damper springs 15 are curved radially outwardly, so that each spring seat 24 moves away from the projected wall 20 to form a space L, FIG. 4, between the seat 24 and the drive plate claw 23. Thus the clutch plate 11 and the drive plate 13 can axially smoothly move with respect to the claw 23, resulting in smooth engagement and disengagement operation of the clutch.

Figure 6:
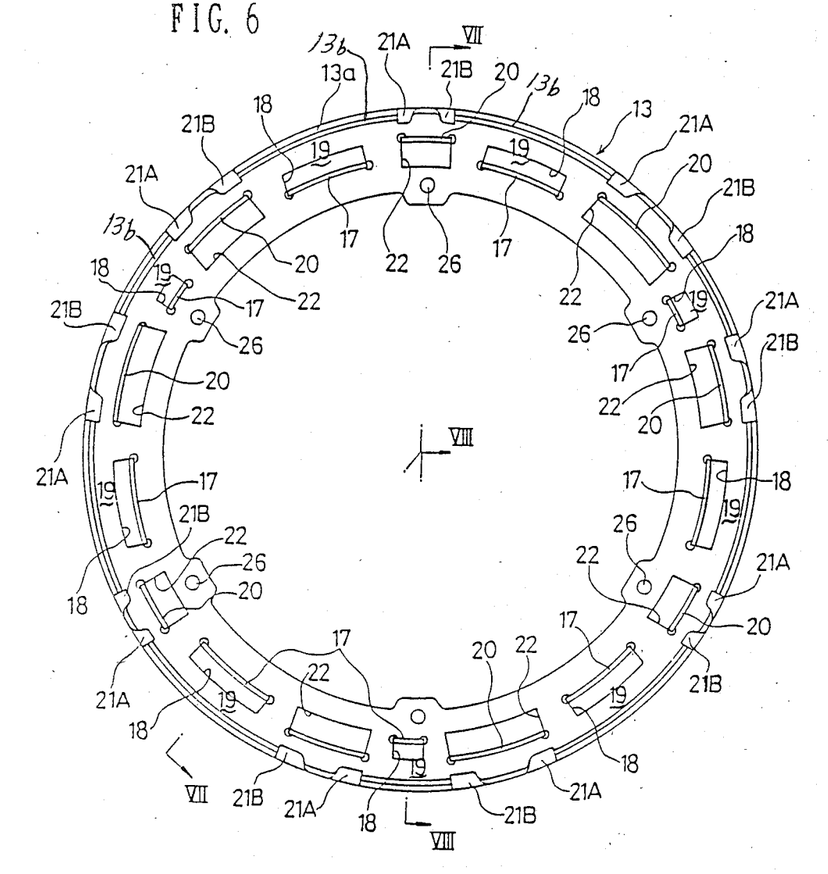
FIG. 6 is an elevation of the drive plate alone.
Figure 7:
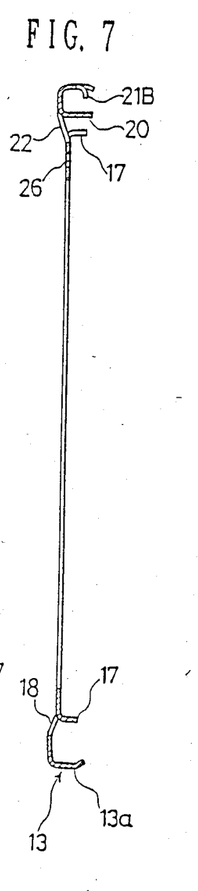
FIG. 7 is a sectional view taken along the line VII—VII in FIG. 6.
Figure 8:
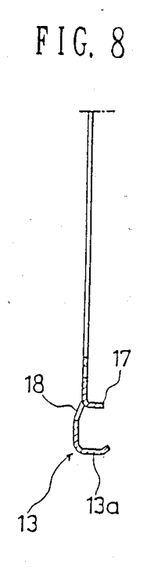
FIG. 8 is a sectional view taken along the line VIII—VIII in FIG. 6.
Figure 9:
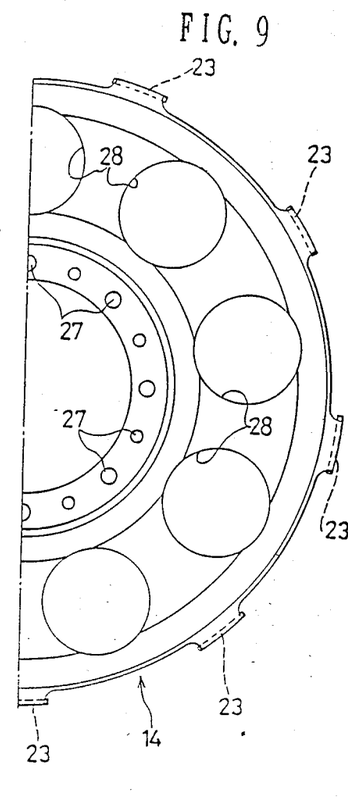
FIG. 9 is a fragmentary elevation of a driven plate.
Figure 10:
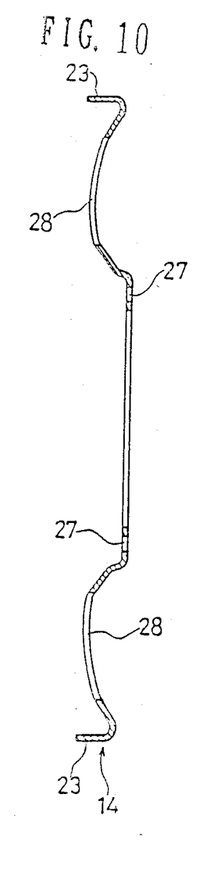
FIG. 10 is a sectional view of the driven plate.

As shown in FIGS. 2 and 3, a facing 25 is fixed to the outer peripheral portion of the clutch plate 11. As shown in FIG. 6, apertures 26 formed in the drive plate 13 for said rivets 12 (FIG. 2) are formed at convex portions which are circumferentially spaced at the inner peripheral portion of the drive plate. As shown in FIG. 9, apertures 27 for the rivets which fix the driven plate 14 to the turbine is formed at the inner peripheral portions of the driven plate 14. As shown in FIGS. 1 and 9, the driven plate 14 is provided with equally spaced circular openings 28 for reducing the weight thereof.

When the lock-up clutch engages to transmit a torque in a positive direction indicated by the arrow A, the torque is initially transmitted from the projected walls 20 and the projections 21A of the drive plate 13 to the claws 23 of the driven plate 14 through the long springs 15 and the spring seats 24. After the long springs 15 are compressed for the amount corresponding to the space da in FIG. 1, the projected walls 20 and the projections 21A of the drive plate 13 engage with the spring seats 24 at the ends of the short springs 16, so that the short springs 16 start to be compressed, and thus, the torque is also transmitted through the short springs 16. Thus, relationship between the torsion angle and the transmitted torque changes and inclination of damper characteristics increases at an angle αa (or αb), as shown in FIG. 13.

When the negative torque is transmitted, the operation is performed similarly to that described above, except for that the projections 21B function to compress the springs instead of the projections 21A.

In the assembling operation, the damper springs 15 and 16 equipped with the spring seats 24 are fitted in the spring pockets 19 and engage with the projected walls 20 and the projections 21A or 21B, so that they are prevented from radially dropping by the rims 13a and the support walls 17 of the drive plate 13. Therefore, it is not necessary to manually keep the damper springs 15 and 16 during the assembling of the drive plate 13 and the drive plate 14.

According to the invention, as described hereinbefore, there are following advantages.

Since the cylindrical rims 13a at the outer periphery of the drive plate 13 have the radially inwardly tapered ends (i.e., the stoppers), the rims 13a have high strength against centrifugal force, so that the thickness of the plate 13 can be reduced. Because the damper springs are held only by the drive plate 13, it is unnecessary to apply surface hardening treatment to the clutch plate 11 and manufacturing cost can be reduced.

The springs seats 24 prevent the nonuniform contact and deviated load between the springs and the plates 13 or 14 is durability can be increased.

The spaces may be formed between the claws 23 and the damper springs when the springs are radially outwardly curved by the centrifugal forces, in which case the clutch plate 17 can move smoothly axially.

The spring seats 24 may be formed to slidably contact the rims 13a, in which case the friction between the seats and rims generates a hysteresis torque and achieves high damping effect during low speed driving where there is a large fluctuation of torque.

Because the damper springs 15 and the spring seats 24 are fitted into the drive plate 13, they do not drop and are held in predetermined positions during the assembling, so that assembling can be easily performed.

As apparent from the above description, the lock-up damper disk according to the invention is usefully employed in the torque converters of the automobiles and others.

What is claimed is:

1. A damper disc for a lock-up clutch for a torque converter having a damper disc disposed between a front cover connected to a pump of the torque converter and a turbine of the torque converter connected to an output shaft and including an axially movable clutch plate for frictionally engaging said front cover and a plurality of circumferentially extending damper springs for elastically connecting said clutch plate to said turbine; characterized in that a drive plate made of sheet metal is fixed at radially inner portions thereof to said clutch plate, said clutch plate, at its outer periphery, having an axially extending clutch plate rim extending axially toward said turbine, said drive plate including rims and support walls for holding radially outer and inner sides of said damper springs, respectively, as well as, radially outer projections and inner projected walls located between adjacent of said circumferentially extending damper springs for engaging ends of said adjacent damper springs, claws rigidly connected to said turbine disposed between said radially adjacent projections and said projected walls, respectively, said drive plate rims extending axially toward said turbine radially inside said clutch plate rim and spaced radially inwardly from said clutch plate rim for forming a clearance therebetween, said drive plate rims including radially inwardly inclined stoppers at the ends thereof and projecting axially beyond the end of said clutch plate rim for preventing axial movement of said damper springs, and spring seats fitted into ends of said damper springs, respectively, said inner projected walls being circumferentially retracted with respect to said projections so that said damper springs may form nearly linear shapes when said torque converter is at rest or turning at relatively low speed rather than radially outwardly curved shapes formed by said damper springs at higher speeds of said torque converter.

2. A damper disc of claim 1 wherein the inner peripheral portion of said drive plate is riveted to said clutch plate.

* * * * *